US 9,362,812 B2

(12) United States Patent
Osterberg

(10) Patent No.: US 9,362,812 B2
(45) Date of Patent: Jun. 7, 2016

(54) SHAFT COUPLING APPARATUS, ROTARY FLUID DAMPER, AND DEPLOYABLE DEVICE WITH MAGNETIC COUPLING MECHANISM

(71) Applicant: David Osterberg, Sun City West, AZ (US)

(72) Inventor: David Osterberg, Sun City West, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 708 days.

(21) Appl. No.: 13/622,296

(22) Filed: Sep. 18, 2012

(65) Prior Publication Data
US 2014/0077646 A1    Mar. 20, 2014

(51) Int. Cl.
*H02K 49/10*    (2006.01)
*F16F 9/12*    (2006.01)

(52) U.S. Cl.
CPC ............... *H02K 49/106* (2013.01); *F16F 9/12* (2013.01); *H02K 49/108* (2013.01)

(58) Field of Classification Search
CPC ..................... H02K 49/104; H02K 49/108
USPC .................................................. 310/103, 104
See application file for complete search history.

(56) References Cited

U.S. PATENT DOCUMENTS

| | | | |
|---|---|---|---|
| 3,572,981 A * | 3/1971 | Pearson et al. ............... | 417/415 |
| 3,573,517 A * | 4/1971 | Osterstrom ..................... | 310/103 |
| 4,304,532 A * | 12/1981 | McCoy .......................... | 417/420 |
| 4,616,740 A | 10/1986 | Okamoto et al. | |
| 4,754,181 A * | 6/1988 | Mizobuchi et al. ........... | 310/104 |
| 4,938,322 A | 7/1990 | Sugasawara et al. | |
| 5,017,102 A * | 5/1991 | Shimaguchi et al. ......... | 417/420 |
| 5,921,357 A | 7/1999 | Starkovich et al. | |
| 5,992,582 A | 11/1999 | Lou et al. | |
| 6,095,295 A | 8/2000 | Park et al. | |
| 6,336,252 B1 | 1/2002 | Bando | |
| 6,755,287 B2 * | 6/2004 | Hadden et al. ................ | 188/290 |
| 6,796,563 B2 | 9/2004 | Ruebsamen et al. | |
| 7,637,360 B2 | 12/2009 | Carlson et al. | |
| 8,136,645 B2 | 3/2012 | Kobayashi et al. | |
| 2005/0206260 A1 * | 9/2005 | Akiyama ....................... | 310/104 |
| 2006/0114445 A1 * | 6/2006 | Ebihara .......................... | 355/72 |
| 2006/0245944 A1 | 11/2006 | Leck et al. | |

OTHER PUBLICATIONS

Burgess, S. C., et al; The Development of a Novel Rotary Damping Mechanism for Aerospace Deployment Systems, Materials & Design, vol. 18. No. 1, pp. 17-24, 1997; Elsevier Science Ltd.

* cited by examiner

*Primary Examiner* — Naishadh Desai
(74) *Attorney, Agent, or Firm* — Ingrassia Fisher & Lorenz, P.C.

(57) ABSTRACT

A shaft coupling apparatus, a rotary fluid damper, and a deployable device are provided herein. In an embodiment, the shaft coupling apparatus includes a chamber having a non-magnetic diaphragm delimiting at least a portion of the chamber. A first shaft is disposed in the chamber and is rotatable about a first axis. A second shaft is disposed outside of the chamber and is rotatable about the first axis. The diaphragm is disposed between the first and second shafts and separates the first and second shafts from direct physical contact. A magnetic coupling mechanism includes a first magnetic coupler attached to the first shaft and a second magnetic coupler attached to the second shaft, with the first and second magnetic couplers separated by the diaphragm. Magnetic coupling forces are generated between the first and second magnetic couplers to transfer rotational energy from the first magnetic coupler to the second magnetic coupler.

11 Claims, 4 Drawing Sheets

SHAFT COUPLING APPARATUS, ROTARY FLUID DAMPER, AND DEPLOYABLE DEVICE WITH MAGNETIC COUPLING MECHANISM

TECHNICAL FIELD

The technical field generally relates to shaft coupling apparatuses, rotary fluid dampers, and deployable devices in which one shaft is coupled to another shaft for transferring rotational force. More particularly, the technical field relates to shaft coupling apparatuses, as well as rotary fluid dampers and deployable devices that include the shaft coupling apparatuses, that enable a first shaft to be coupled to a second shaft without mechanical contact between the shafts while enabling rotational force to be transferred between the shafts.

BACKGROUND

Shaft coupling apparatuses are useful in various applications to enable transfer of force from one shaft to another shaft. Shaft coupling apparatuses have a variety of uses such as, but not limited to, providing force from a single input shaft to multiple driven shafts that can be used for separate operations, translating input force into a different output force (e.g., converting linear movement to rotational movement and vice versa), damping input force from one shaft using another shaft that is connected to the input shaft through the shaft coupling apparatus and that is also connected to a damping mechanism, and the like.

Rotary fluid dampers find wide-ranging use to damp input force as described above. The rotary fluid dampers generally include a damping shaft with a rotating member mounted thereon. The rotating member is disposed in a chamber that includes damping fluid, and the damping fluid provides resistance to movement of the rotating member therethrough. The damping shaft is coupled to an input shaft through a shaft coupling apparatus, and rotational movement of the input shaft is damped as a result of the damping resistance experienced by the rotating member that is mounted on the damping shaft. The rotary fluid dampers are useful in various applications where uncontrolled rotation of the input shaft is undesired, or where excessive rotation of the input shaft could cause an undesired outcome. As one example, since the onset of space exploration and satellite usage, there has been a need to control deployments of spacecraft-mounted appendages such as antennas, solar arrays, and booms. Controlling such deployments can reduce the loads of appendage spacecraft primary structures as well as momentum compensation demands on the spacecraft attitude control system. Rotary fluid dampers are useful in controlling the deployments.

Generally, the appendage deployments are controlled by passive rotary dampers. These rotary dampers normally are attached to a spring-loaded device or motor in a parallel fashion. The rotary dampers provide velocity damping to the system by either restricting fluid flow across an orifice or by electro-magnetically removing energy from the system by generating eddy currents internal to the spring-loaded device. However, such rotary dampers have a propensity to leak viscous fluid from shaft seals in a shaft coupling apparatus thereof and have inconsistent performance due to various factors, including a lack of thermal compensation.

A variety of sealing mechanisms have been developed to reduce fluid leakage in rotary dampers. For example, rubbing seals have been employed to seal shafts, but the rubbing seals are still prone to leakage, especially under harsh conditions such as in outer space. Flexible bellows have also been employed that seal an interface between an input shaft and an output shaft in a shaft coupling apparatus, with the input shaft and the output shaft maintained in separate environments and the interface between the shafts maintained in its own environment within the flexible bellows. However, the flexible bellows are prone to failure and have limited rotation.

While leakage of fluid from rotary dampers is a concern associated with shaft coupling apparatuses, other applications for shaft coupling apparatuses benefit from enhanced sealing within the shaft coupling apparatuses in different ways. For example, various sensitive fabrication processes and devices benefit from clean or ultraclean environments, and improved sealing between shafts in a shaft coupling mechanism is useful to prevent flow of contaminants between the shafts and to maintain a clean or ultraclean environment between an input shaft located outside of the clean or ultraclean environment and an output shaft that is located inside the clean or ultraclean environment.

Accordingly, it is desirable to provide shaft coupling apparatuses that include coupling mechanisms between shafts, with transfer of rotational energy between shafts supported, while providing robust separation of the shafts in their own environments to hinder leakage of fluid and/or contaminants between the environments. In addition, it is desirable to provide rotary fluid dampers and deployable devices including the shaft coupling apparatuses. Furthermore, other desirable features and characteristics of the present invention will become apparent from the subsequent detailed description of the invention and the appended claims, taken in conjunction with the accompanying drawings and this background of the invention.

BRIEF SUMMARY

A shaft coupling apparatus, a rotary fluid damper, and a deployable device are provided herein. In an embodiment, the shaft coupling apparatus includes a chamber that has a non-magnetic diaphragm delimiting at least a portion of the chamber. A first shaft is disposed in the chamber and is rotatable about a first axis. A second shaft is disposed outside of the chamber and is rotatable about the first axis. The non-magnetic diaphragm is disposed between the first shaft and the second shaft and separates the first shaft and the second shaft from direct physical contact. A magnetic coupling mechanism includes a first magnetic coupler attached to the first shaft in the chamber and a second magnetic coupler attached to the second shaft outside of the chamber. The first magnetic coupler and the second magnetic coupler are separated by the non-magnetic diaphragm. Magnetic coupling forces are generated between the first magnetic coupler and the second magnetic coupler to transfer rotational energy from the first magnetic coupler to the second magnetic coupler.

In another embodiment, a rotary fluid damper includes a hermetically-sealed chamber that has a non-magnetic diaphragm delimiting at least a portion of the hermetically-sealed chamber. A first shaft is disposed in the hermetically-sealed chamber and is rotatable about a first axis. A rotating member is mounted on the first shaft and is disposed within the hermetically-sealed chamber. The rotating member is spaced apart from at least a portion of an inner surface of the hermetically-sealed chamber to define a gap between the rotating member and the inner surface of the hermetically-sealed chamber. A damping fluid is disposed at least within the gap. A second shaft is disposed outside of the hermetically-sealed chamber and is rotatable about the first axis. The non-magnetic diaphragm is disposed between the first shaft and the second shaft. The rotary fluid damper further includes a magnetic coupling mechanism that includes a first magnetic coupler attached to the first shaft in the hermetically-sealed chamber and a second magnetic coupler attached to the second shaft outside of the hermetically-sealed chamber. The first magnetic coupler and the second magnetic coupler are separated by the non-magnetic diaphragm, and magnetic coupling forces are generated between the first magnetic coupler and the second magnetic coupler.

In another embodiment, a deployable device includes a hermetically-sealed chamber that has a non-magnetic diaphragm delimiting at least a portion of the hermetically-sealed chamber. A damping shaft is disposed in the hermetically-sealed chamber and is rotatable about a first axis. A rotating member is mounted on the damping shaft and is disposed within the hermetically-sealed chamber. The rotating member is spaced apart from at least a portion of an inner surface of the hermetically-sealed chamber to define a gap between the rotating member and the inner surface of the hermetically-sealed chamber. A damping fluid is disposed at least within the gap. An input shaft is disposed outside of the hermetically-sealed chamber and is rotatable about the first axis. The non-magnetic diaphragm is disposed between the damping shaft and the input shaft. A magnetic coupling mechanism including a first magnetic coupler is attached to the damping shaft in the hermetically-sealed chamber, and a second magnetic coupler is attached to the input shaft outside of the hermetically-sealed chamber. The first magnetic coupler and the second magnetic coupler are separated by the non-magnetic diaphragm, and magnetic coupling forces are generated between the first magnetic coupler and the second magnetic coupler. The deployable device further includes an actuator that is in mechanical communication with the input shaft for imparting rotational movement to the input shaft. An extensible member is connected to the input shaft and is deployable upon rotational movement of the input shaft.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

A shaft coupling apparatus, a rotary fluid damper including the shaft coupling apparatus, and a deployable device including the rotary fluid damper are provided herein. The shaft coupling device includes a magnetic coupling mechanism between a first shaft that is disposed in a chamber and a second shaft that is disposed outside of the chamber, with the first shaft and the second shaft rotatable about a common first axis. The first shaft and the second shaft are separated by a non-magnetic diaphragm that delimits at least a portion of the chamber, with a first magnetic coupler of the magnetic coupling mechanism attached to the first shaft in the chamber and a second magnetic coupler of the magnetic coupling mechanism attached to the second shaft outside of the chamber and with the non-magnetic diaphragm separating the first magnetic coupler and the second magnetic coupler. The non-magnetic diaphragm enables the chamber to be effectively sealed to hinder or prevent leakage of fluid and/or contaminants from inside the chamber to an ambient environment that surrounds the chamber, or vice versa, while the magnetic coupling mechanism enables transfer of rotational energy between the first shaft and the second shaft. The shaft coupling apparatus is useful in a variety of applications where it is desirable to transfer rotational energy between an input shaft and an output shaft, such as a damping shaft, including within sensitive fabrication processes where there is a desire to maintain a clean or ultraclean environment and aerospace applications such as rotary fluid dampers included in deployable devices where fluid leakage from the rotary fluid dampers could result in device failure.

Figure 3:
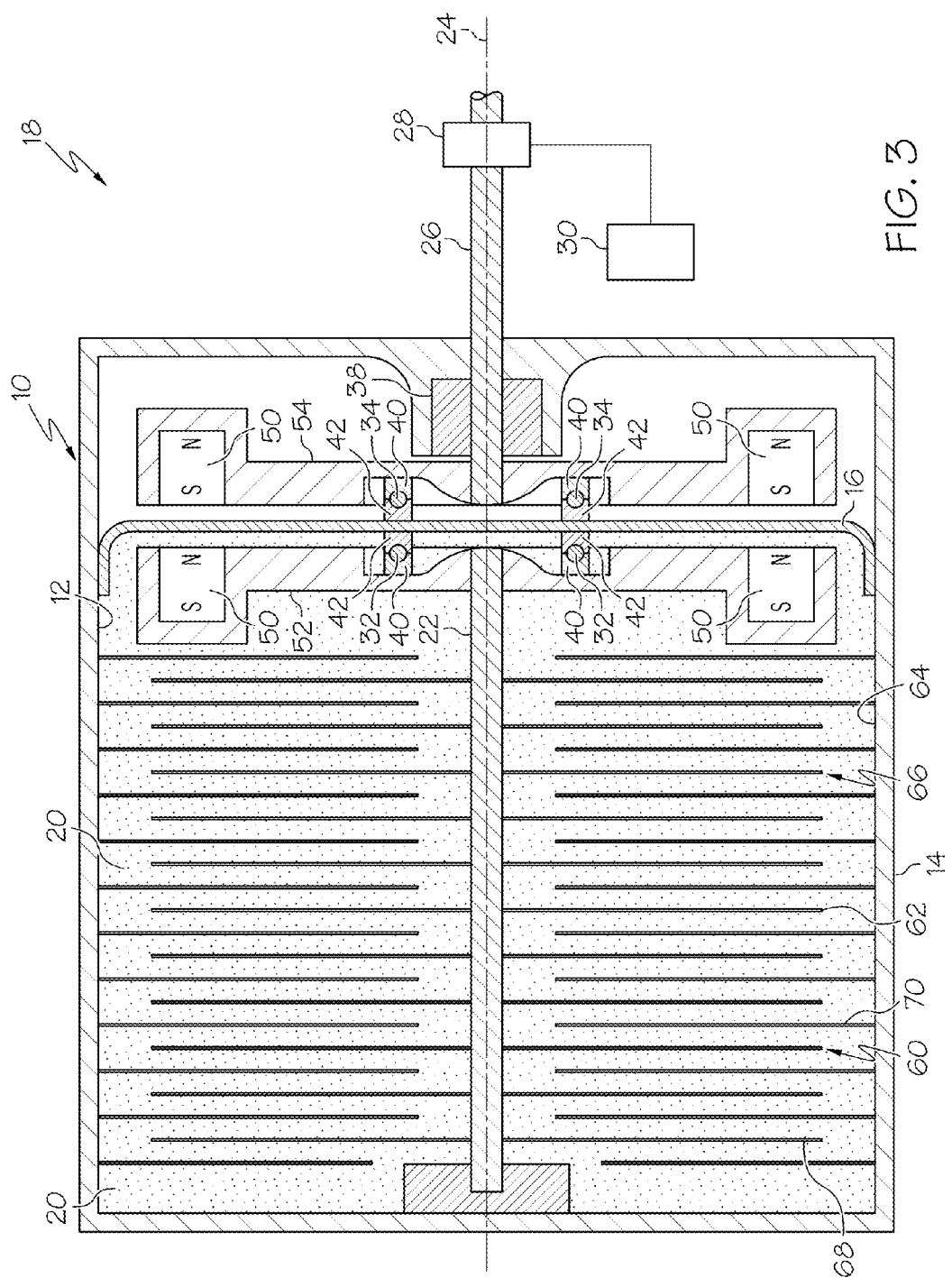
FIG. 3 is a schematic cross-sectional side view of a rotary fluid damper in accordance with an embodiment.

An exemplary embodiment of a shaft coupling apparatus 10 will now be described with reference to FIG. 1. The shaft coupling apparatus 10 includes a chamber 12 that may be effectively sealed from an ambient environment that surrounds the chamber 12. In particular, the chamber 12 may be hermetically sealed to include integral walls 14 that are free of openings in the integral walls 14 or between the integral walls 14. By "integral walls", it is meant that all walls 14 of the chamber 12 can be permanently connected, such as through welding or other bonding techniques. Further, the chamber 12 can be completely sealed from access into the chamber 12, with no openings in the chamber 12 such that once the chamber 12 is sealed, access inside the chamber 12 is not possible without dismantling the shaft coupling apparatus 10. In another embodiment, the chamber 12 may define a sealable opening (not shown) that can be sealed with a plug, door, or the like to enable ingress and egress into/out of the chamber 12. For example, the chamber 12 can be a clean room that allows tightly controlled access into the clean room with appropriate anti-contamination measures. As another example, as described in further detail below and as shown in FIG. 3, the chamber 12 can be a viscous fluid chamber 12 that contains a damping fluid 20.

Figure 1:
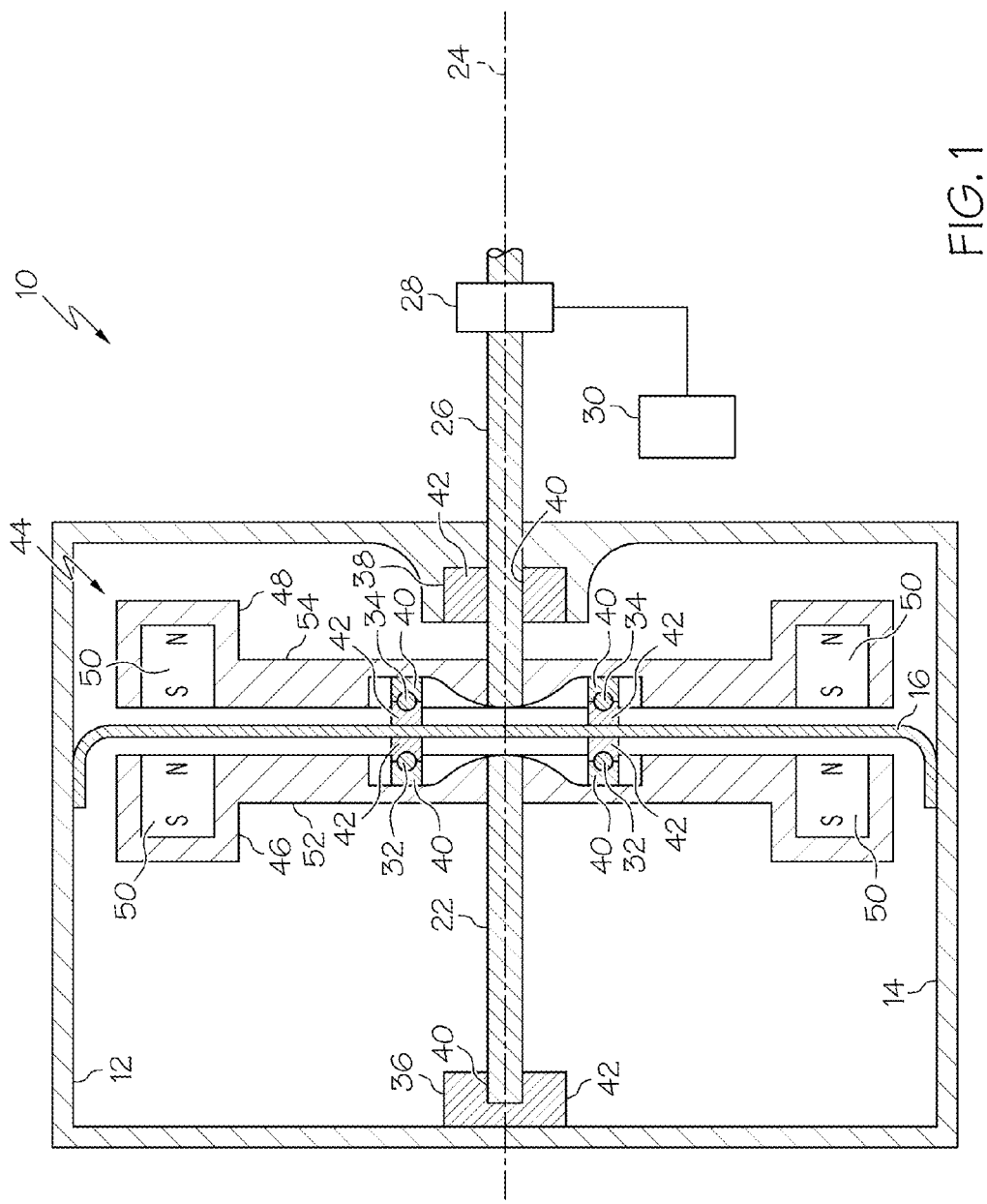
FIG. 1 is a schematic cross-sectional side view of a shaft coupling mechanism in accordance with an embodiment.

As shown in FIG. 1, the chamber 12 has a non-magnetic diaphragm 16 that delimits at least a portion of the chamber 12. By "non-magnetic", it is meant that the non-magnetic diaphragm 16 includes non-ferromagnetic or non-ferrimagnetic material such that the non-magnetic diaphragm 16 does not strongly respond to an applied magnetic field. To enable the chamber 12 to be sealed, the non-ferromagnetic or non-ferrimagnetic material may be a metal that is capable of readily bonding to other walls 14 that define the chamber 12. Suitable non-ferromagnetic and non-ferrimagnetic materials for the non-magnetic diaphragm 16 include, but are not limited to, those chosen from copper, silver, and aluminum. Materials for other walls 14 that define the chamber 12 are not particularly limited, and may include ferromagnetic or ferromagnetic materials as well as the materials for the non-magnetic diaphragm 16 that are set forth above, provided that the materials for the other walls 14 avoid materially impacting the operation of the shaft coupling apparatus 10.

In an embodiment, the non-magnetic diaphragm 16 may delimit the entire chamber 12, as shown in FIG. 1. For example, the non-magnetic diaphragm 16 extends across and seals an entire side of the chamber 12, and the non-magnetic diaphragm 16 may be secured in place through welding or other bonding technique to other walls 14 that define the chamber 12. Alternatively, although not shown, the non-magnetic diaphragm 16 may delimit a portion of the chamber 12 by defining part of a wall of the chamber 12, with other materials forming a remainder of the wall.

Contents of the chamber 12 are not particularly limited, but rather are dependent upon the particular application in which the shaft coupling apparatus 10 is employed. For example, in an embodiment and as described in further detail below with reference to FIG. 3, the shaft coupling apparatus 10 is employed in a rotary fluid damper 18 and the chamber 12 is filled with a damping fluid 20, such as a Newtonian fluid 20. As known in the art, Newtonian fluid is a fluid that has linear stress versus strain properties, meaning that the fluid continues to flow regardless of the forces acting on it (e.g., magnetic forces). One example of a suitable Newtonian fluid is silicone fluid.

Referring to FIG. 1, a first shaft 22 is disposed in the chamber 12 and is rotatable about a first axis 24, and a second shaft 26 is disposed outside of the chamber 12 and is also rotatable about the first axis 24. Because the first shaft 22 is disposed in the chamber 12, the first shaft 22 is generally an output shaft 22 that moves in response to movement from the second shaft 26, which is generally an input shaft 26. For example, in an embodiment and as shown schematically in FIG. 1, an actuator 28 imparts rotational movement to the second shaft 26, and the actuator 28 may be controlled by a controller 30 such as a computer that may control the actuator 28 in addition to a plurality of other devices (not shown). The actuator 28 may be in mechanical communication with the second shaft 26 for imparting rotational movement to the second shaft 26, and the actuator 28 is not limited to any particular type of mechanism. Although details of the actuator 28 are not shown, in an embodiment, the actuator 28 includes a pyro device and a clock spring (both not shown), and such actuators 28 are known in the art. To impart rotational force to the second shaft 26, the pyro device releases the clock spring, which imparts rotational movement to the second shaft 26. It is to be appreciated that the second shaft 26 may receive input forces from other shafts (not shown) and need not be directly driven, but the second shaft 26 as referred to herein directly induces rotational movement of the first shaft 22 as described in further detail below.

In an embodiment and as shown in FIG. 1, the first shaft 22 and the second shaft 26 are supported by bearings 32, 34, 36, 38. The bearings 32, 34, 36, 38 may be arranged in any manner that is suitable to support rotation of the first shaft 22 and the second shaft 26 about the first axis 24, and configuration of the bearings 32, 34, 36, 38 is not particularly limited. For example, in an embodiment, a first bearing 32 supports the first shaft 22 in the chamber 12, adjacent to the non-magnetic diaphragm 16, and a second bearing 34 supports the second shaft 26 adjacent the non-magnetic diaphragm 16 on an opposite side of the non-magnetic diaphragm 16 from the first bearing 32. In this embodiment, the non-magnetic diaphragm 16 provides a bearing surface for the first bearing 32 and the second bearing 34 on opposite sides of the non-magnetic diaphragm 16. Additional bearings 36, 38 can be disposed along the first shaft 22 and the second shaft 26 to provide further stabilization of the first shaft 22 and the second shaft 26 during rotation. For example, as shown in FIG. 1, stabilizing bearings 36, 38 support the first shaft 22 and the second shaft 26 on opposite ends of the first shaft 22 and the second shaft 26, respectfully, from the first bearing 32 and the second bearing 34. In an embodiment, the bearings 32, 34, 36, 38 are thrust bearings that support the first shaft 22 and the second shaft 26, with rotating bearing surfaces 40 attached to the first shaft 22 and the second shaft 26, respectfully, and with stationary bearing surfaces 42 attached to structure adjacent the first shaft 22 and the second shaft 26 (e.g., the non-magnetic diaphragm 16, a wall that defines the chamber 12, etc.) to support the first shaft 22 or second shaft 26. It is to be appreciated that bearings other than thrust bearings are also suitable, such as angular contact or roller bearings, so long as rotation of the first shaft 22 and the second shaft 26 can be maintained about the first axis 24.

As shown in FIG. 1, the non-magnetic diaphragm 16 is disposed between the first shaft 22 and the second shaft 26 and separates the first shaft 22 and the second shaft 26 from direct physical contact, thereby maintaining the sealed nature of the chamber 12 and preventing fluid leakage between the first shaft 22 and the second shaft 26. The shaft coupling apparatus 10 includes a magnetic coupling mechanism 44 to facilitate transfer of rotational energy between the first shaft 22 and the second shaft 26. The non-magnetic diaphragm 16, while separating the first shaft 22 and the second shaft 26 from direct physical contact, still enables transfer of rotation energy between the first shaft 22 and the second shaft 26 using the magnetic coupling mechanism 44. Referring to FIG. 1, the magnetic coupling mechanism 44 includes a first magnetic coupler 46 that is attached to the first shaft 22 in the chamber 12, and the magnetic coupling mechanism 44 also includes a second magnetic coupler 48 that is attached to the second shaft 26 outside of the chamber 12.

Magnetic coupling forces are generated between the first magnetic coupler 46 and the second magnetic coupler 48 to transfer rotational energy from the first magnetic coupler 46 to the second magnetic coupler 48. To effectively couple the first shaft 22 and the second shaft 26, the magnetic coupling forces are generally attracting magnetic coupling forces and are provided by alignment of opposing poles of magnets 50 between the first magnetic coupler 46 and the second magnetic coupler 48, as shown in FIG. 1, with the first magnetic coupler 46 and the second magnetic coupler 48 magnetically held in alignment through the attracting magnetic coupling forces. Specific configurations of magnets 50 in the first magnetic coupler 46 and the second magnetic coupler 48 are not particularly limited so long as sufficient attracting magnetic coupling forces are established to couple the first shaft 22 and the second shaft 26 through an operational range of rotational forces that are experienced by the first shaft 22 and the second shaft 26. In an embodiment and as shown in FIG. 1, the first magnetic coupler 46 and the second magnetic coupler 48 each include a disk 52, 54 that has magnets 50 spaced about a periphery of the respective disks 52, 54, with magnetic alignment of poles in the magnets 50 being perpendicular to a plane of the respective disks 52, 54 and with opposing poles of respective magnets 50 in the first magnetic coupler 46 and the second magnetic coupler 48 aligned across the non-magnetic diaphragm 16. Although FIG. 1 shows a cross-section of the disks 52, 54 and the magnets 50 contained therein, it is to be appreciated that the magnets 50 may be arranged about the entire periphery of the disks 52, 54, or may be disposed at select locations to ensure that sufficient magnetic coupling forces are established between the disks 52, 54. The magnets 50 on each disk 52, 54 may be arranged in an appropriate configuration to maximize the magnetic coupling forces between the disks 52, 54, such as in a Halbach array (not shown). Alternatively, although again not shown, the magnets 50 on each disk 52, 54 may be arranged with alternating poles, i.e., with adjacent magnets 50 in the same disk 52, 54 having an opposing configuration of poles. Attracting forces pull the first magnetic coupler 46 and the second magnetic coupler 48 together, with the first bearing 32 and the second bearing 34 being pre-loaded under the magnetic coupling forces between the first magnetic coupler 46 and the second magnetic coupler 48.

Figure 2:
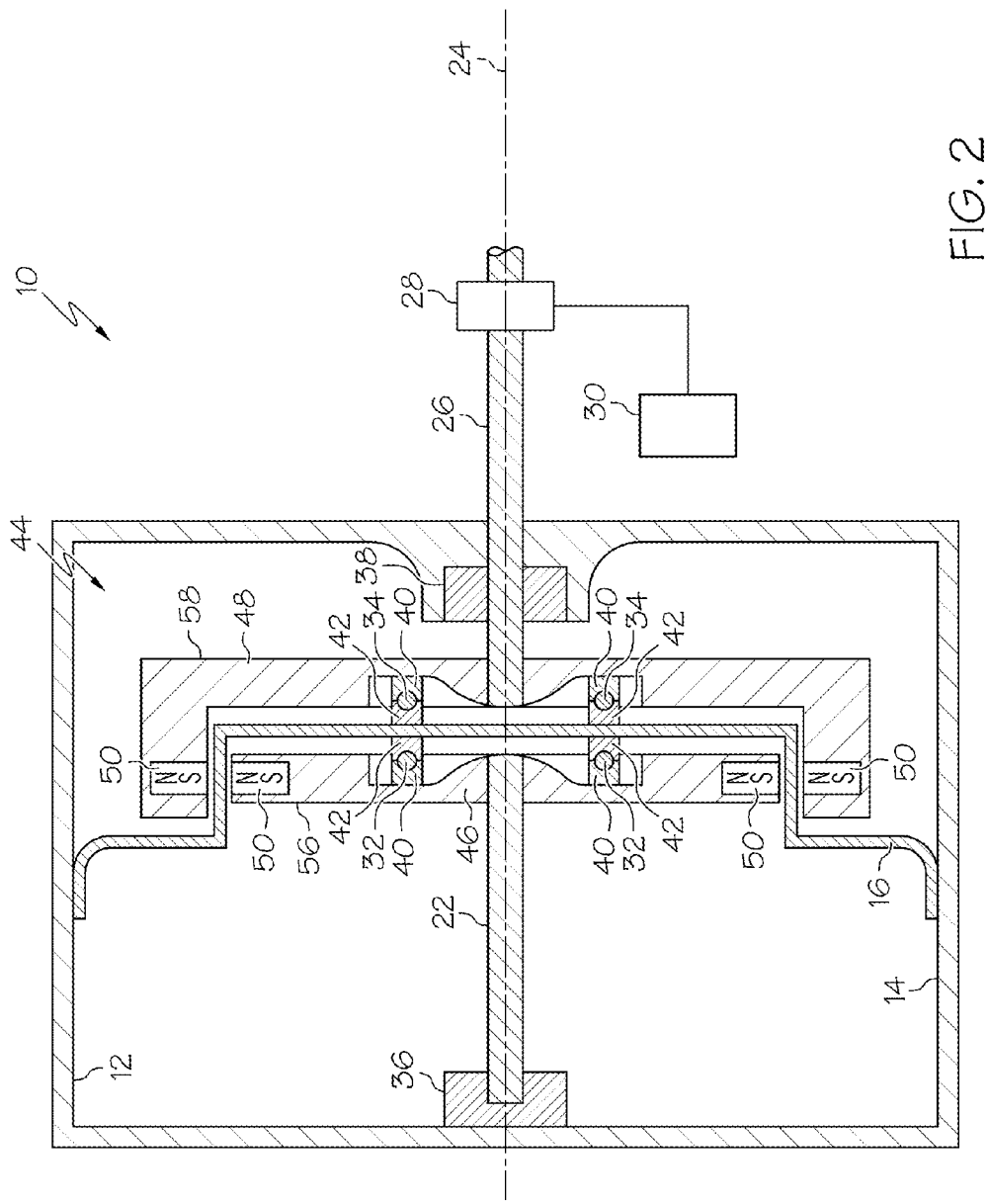
FIG. 2 is a schematic cross-sectional side view of another embodiment of a shaft coupling mechanism.

In an alternative embodiment, as shown in FIG. 2, the first magnetic coupler 46 includes a rotor 56 that has magnets 50 spaced about a periphery of the rotor 56, and the second magnetic coupler 48 includes a cylinder 58 that is concentrically disposed about the rotor 56 and that has magnets 50 spaced along an inner periphery of the cylinder 58. In this embodiment, poles in the magnets 50 of the rotor 56 and the cylinder 58 are in radial magnetic alignment, and opposing poles of respective magnets 50 in the rotor 56 and the cylinder 58 are aligned across the non-magnetic diaphragm 16. While the rotor 56 is shown on the first shaft 22 and the cylinder 58 is shown on the second shaft 26 of FIG. 2, it is to be appreciated that the configuration of the rotor 56 and the cylinder 58 can be reversed (although not shown), with the rotor 56 disposed on the second shaft 26 and the cylinder 58 disposed on the first shaft 22. Such configurations represent alternatives to the configuration of disks 52 that is shown in FIG. 1, although both configurations may be effective to couple the first shaft 22 and the second shaft 26.

In an embodiment and as shown in FIG. 3, the shaft coupling apparatus 10 is included in a rotary fluid damper 18. The rotary fluid damper 18 effectively damps rotational force that is transferred from the second shaft 26 to the first shaft 22, which has the effect of slowing rotation of the second shaft 26 to provide more controlled, even rotation of the second shaft 26. The rotary fluid damper 18 is particularly useful when the actuator 28 that is mechanical communication with the second shaft 26 provides uncontrolled rotational force to the second shaft 26, as may be the case when the pyro device and clock spring are employed in the actuator 28.

In an embodiment and as shown in FIG. 3, the rotary fluid damper 18 includes a rotating member 60 that is mounted on the first shaft 22 and that is disposed within the chamber 12. In this embodiment, the first shaft 22 is a damping shaft 22 and the second shaft 26 is an input shaft 26. The rotating member 60 is spaced apart from at least a portion of an inner surface 64 of the chamber 12 to define a gap 62 between the rotating member 60 and the inner surface 64 of the chamber 12. Damping fluid 20, such as the Newtonian fluid 20 described above, is disposed at least within the gap 62 for providing viscous resistance to the rotating member 60. In this embodiment, the chamber 12 is hermetically sealed to prevent leakage of the damping fluid 20 out of the chamber 12, and to further prevent introduction of trapped air into the chamber 12 that could impact operation of the rotary fluid damper 18.

The rotating member 60 and the inner surface 64 of the chamber 12 define a shear damping mechanism 66. In this regard, the rotating member 60 and the inner surface 64 of the chamber 12 can have various configurations to promote viscous resistance and shear damping performance. In an embodiment and as shown in FIG. 3, the rotating member 60 includes a series of shear plates 68 and the inner surface 64 of the chamber 12 includes stationary annular extensions 70 that extend toward the first shaft 22. The shear plates 68 of the rotating member 60 and the stationary annular extensions 70 can be interspersed in an alternating manner in the chamber 12 to define the gap 62 between the shear plates 68 and the stationary annular extensions 70 and to define the shear damping mechanism 66. The interspersed nature of the shear plates 68 of the rotating member 60 and the stationary annular extensions 70 can maximize contact surface area with the damping fluid 20, therefore maximizing shear damping that can be achieve with the rotary fluid damper 18.

It is to be appreciated that alternative configurations of the shear damping mechanism 66 can be employed in place of the configuration described and shown in FIG. 3. For example, in an alternative embodiment and although not shown, the rotating member 60 can be a drum damper and the inner surface 64 of the chamber 12 may be conformal to a surface of the drum damper, although such configuration does not provide as much surface area as the shear plates 68 and annular extensions that are described above and shown in FIG. 3. Additionally, a bellows (not shown) may be provided in the chamber 12 for providing fluid thermal compensation within the chamber 12 and the assist with leakage prevention.

Figure 4:
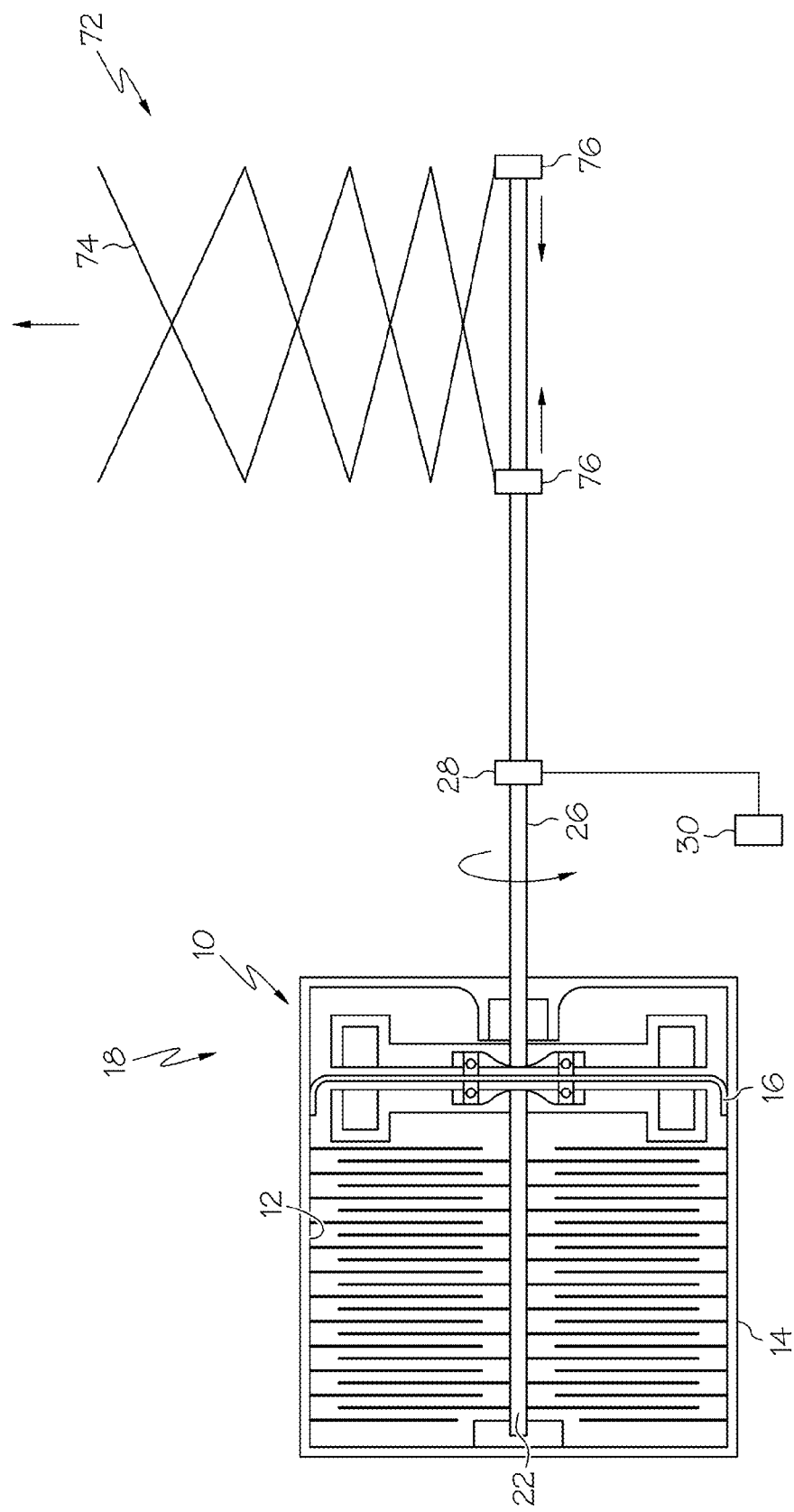
FIG. 4 is a schematic view of a deployable device including the rotary fluid damper of FIG. 3 in accordance with an embodiment.

As alluded to above, the rotary fluid damper 18 is particularly useful in a deployable device 72, and an exemplary embodiment of a deployable device 72 including the rotary fluid damper 18 is shown in FIG. 4. In the deployable device 72, the second shaft 26 is the input shaft 26 and the actuator 28 is in mechanical communication with the second shaft 26 for imparting rotational movement to the second shaft 26. The second shaft 26 is also in mechanical communication with an extensible member 74, such as a boom, and the second shaft 26 deploys the extensible member 74 through the rotational movement of the second shaft 26, optionally through one or more translational devices 76 disposed between the second shaft 26 and the extensible member 74 for translating input force into a different output force (e.g., for converting rotational movement of the second shaft 26 to linear movement that deploys the extensible member 74). The rotary fluid damper 18 effectively damps the rotation of the second shaft 26 to provide smooth deployment of the extensible member 74.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A rotary fluid damper comprising:
  a hermetically-sealed chamber having a non-magnetic diaphragm delimiting at least a portion of the hermetically-sealed chamber, wherein the hermetically sealed chamber is completely sealed from access into the chamber with no openings into the chamber;
  a first shaft disposed in the hermetically-sealed chamber and rotatable about a first axis;
  a rotating member mounted on the first shaft and disposed within the hermetically-sealed chamber, the rotating member spaced apart from at least a portion of an inner surface of the hermetically-sealed chamber to define a gap therebetween;
  a damping fluid disposed at least within the gap;
  a second shaft disposed outside of the hermetically-sealed chamber and rotatable about the first axis, the non-magnetic diaphragm disposed between the first shaft and the second shaft;
  a magnetic coupling mechanism comprising a first magnetic coupler attached to the first shaft in the hermetically-sealed chamber and a second magnetic coupler attached to the second shaft outside of the hermetically-sealed chamber, wherein the first magnetic coupler and the second magnetic coupler are separated by the non-magnetic diaphragm and wherein magnetic coupling forces are generated between the first magnetic coupler and the second magnetic coupler.

2. The rotary fluid damper of claim 1, wherein the rotating member and the inner surface of the hermetically-sealed chamber define a shear damping mechanism.

3. The rotary fluid damper of claim 2, wherein the rotating member comprises a series of shear plates, wherein the inner surface of the hermetically-sealed chamber defines stationary annular extensions that extend toward the first shaft, and wherein the shear plates and stationary annular extensions are interspersed within the hermetically-sealed chamber to define the gap between the shear plates and the annular extensions and to define the shear damping mechanism.

4. The rotary fluid damper of claim 1, wherein the second shaft is an input shaft and wherein an actuator imparts rotational movement to the second shaft.

5. The rotary fluid damper of claim 4, wherein the second shaft deploys an extensible member with the rotational movement thereof.

6. The rotary fluid damper of claim 1, further comprising a first bearing supporting the first shaft in the hermetically-sealed chamber adjacent the non-magnetic diaphragm and a second bearing supporting the second shaft adjacent the non-magnetic diaphragm on an opposite side thereof from the first bearing.

7. The rotary fluid damper of claim 6, wherein the non-magnetic diaphragm provides a bearing surface for the first bearing and the second bearing on opposite sides of the non-magnetic diaphragm.

8. The rotary fluid damper of claim 1, wherein the first magnetic coupler and the second magnetic coupler each comprise a disk having magnets spaced about a periphery thereof, with magnetic alignment of poles in the magnets perpendicular to a plane of the respective disks and with opposing poles of respective magnets in the first magnetic coupler and the second magnetic coupler aligned across the non-magnetic diaphragm.

9. The rotary fluid damper of claim 1, wherein the damping fluid is further defined as a Newtonian fluid.

10. The rotary fluid damper of claim 1, wherein the hermetically-sealed chamber comprises integral walls free of openings therein.

11. A deployable device comprising:
   a hermetically-sealed chamber having a non-magnetic diaphragm delimiting at least a portion of the hermetically-sealed chamber, wherein the hermetically sealed chamber is completely sealed from access into the chamber with no openings into the chamber;
   a damping shaft disposed in the hermetically-sealed chamber and rotatable about a first axis;
   a rotating member mounted on the damping shaft and disposed within the hermetically-sealed chamber, the rotating member spaced apart from at least a portion of an inner surface of the hermetically-sealed chamber to define a gap therebetween;
   a damping fluid disposed at least within the gap;
   an input shaft disposed outside of the hermetically-sealed chamber and rotatable about the first axis, the non-magnetic diaphragm disposed between the damping shaft and the input shaft;
   a magnetic coupling mechanism comprising a first magnetic coupler attached to the damping shaft in the hermetically-sealed chamber and a second magnetic coupler attached to the input shaft outside of the hermetically-sealed chamber, wherein the first magnetic coupler and the second magnetic coupler are separated by the non-magnetic diaphragm and wherein magnetic coupling forces are generated between the first magnetic coupler and the second magnetic coupler;
   an actuator in mechanical communication with the input shaft for imparting rotational movement to the input shaft; and
   an extensible member connected to the input shaft and deployable upon the rotational movement of the input shaft.

\* \* \* \* \*